US011522439B2

(12) United States Patent
Lee et al.

(10) Patent No.: US 11,522,439 B2
(45) Date of Patent: Dec. 6, 2022

(54) SWITCHING REGULATOR WITH DRIVER POWER CLAMP

(71) Applicant: MEDIATEK INC., Hsinchu (TW)

(72) Inventors: Chien-Lung Lee, Hsinchu (TW); Jin-Yan Syu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 82 days.

(21) Appl. No.: 17/092,425

(22) Filed: Nov. 9, 2020

(65) Prior Publication Data

US 2021/0226524 A1 Jul. 22, 2021

Related U.S. Application Data

(60) Provisional application No. 62/961,941, filed on Jan. 16, 2020.

(51) Int. Cl.
| H02M 1/08 | (2006.01) |
| H02M 3/158 | (2006.01) |
| H02M 1/34 | (2007.01) |
| H02M 1/32 | (2007.01) |

(52) U.S. Cl.
CPC .............. H02M 1/08 (2013.01); H02M 1/32 (2013.01); H02M 1/34 (2013.01); H02M 3/158 (2013.01)

(58) Field of Classification Search
CPC ............ H02M 1/08; H02M 1/32; H02M 1/34; H02M 3/1582; H02M 3/158; H02M 3/1588; H02H 7/10; Y02B 70/10
See application file for complete search history.

(56) References Cited

U.S. PATENT DOCUMENTS

| 8,261,105 B2 | 9/2012 | Su et al. | |
| 9,035,687 B2 | 5/2015 | Roewe et al. | |
| 9,343,949 B2 | 5/2016 | Agarwal et al. | |
| 9,673,812 B2 | 6/2017 | Takano | |
| 2006/0119326 A1* | 6/2006 | Jiang | H02M 1/08 323/222 |

(Continued)

FOREIGN PATENT DOCUMENTS

CN 106953510 B 5/2019

OTHER PUBLICATIONS

European Search Report dated Jun. 1, 2021, issued in application No. EP 20213961.4.

Primary Examiner — Kyle J Moody
Assistant Examiner — Jye-June Lee
(74) Attorney, Agent, or Firm — McClure, Qualey & Rodack, LLP

(57) ABSTRACT

A switching regulator clamping the power or ground of the power switch driver is introduced. In a buck regulator, the power switch is coupled between the input terminal of the buck regulator and the first terminal of an inductor. The second terminal of the inductor is coupled to the output terminal of the buck regulator. There is a driver power clamp configured to clamp the ground terminal of the driver of the power switch. In a boost regulator, an inductor is provided which has a first terminal coupled to an input terminal of the boost regulator and has a second terminal coupled to the negative supply terminal of the power supply through a power switch. The boost regulator has a driver power clamp that is configured to clamp the power terminal of the driver of the power switch.

20 Claims, 9 Drawing Sheets

(56) References Cited

U.S. PATENT DOCUMENTS

| | | |
|---|---|---|
| 2015/0097613 A1* | 4/2015 | Roewe ................ H03K 17/165 327/382 |
| 2015/0303828 A1 | 10/2015 | Feng et al. |
| 2018/0262097 A1 | 9/2018 | Chu et al. |
| 2020/0161963 A1* | 5/2020 | Lefevre ................ H02M 1/088 |
| 2021/0226524 A1* | 7/2021 | Lee ........................ H02M 1/08 |

* cited by examiner

SWITCHING REGULATOR WITH DRIVER POWER CLAMP

CROSS REFERENCE TO RELATED APPLICATIONS

This application claims the benefit of U.S. Provisional Application No. 62/961,941, filed on Jan. 16, 2020, the entirety of which is incorporated by reference herein.

BACKGROUND OF THE INVENTION

Field of the Invention

The present invention relates to switching regulators.

Description of the Related Art

A switching regulator is a voltage regulator that uses a switching element to transform the incoming power supply into a regulated output voltage. Power is supplied from the input to the output by turning on and off a power switch (e.g., a MOSFET). The major advantage of a switching regulator is its higher efficiency compared to standard linear regulators. Lower power dissipation is achieved by internally switching the power switch between an on-state and an off-state. Repeatedly switching the power switch makes it possible to supply voltage efficiently and with less heat generation.

However, the switching of the power switch may result in voltage spikes in the circuit. Parasitic capacitance and inductance introduced by a printed circuit board (PCB) or other packaging components may cause signal bounce in response to the switching of the power switch. Signal bounce includes, for example, ground bounce, supply bounce, and output bounce. Some devices in the circuit may be stressed and perhaps damaged due to the potential difference generated by the signal bounces.

FIG. 1A depicts a step-down (buck) regulator 102. When the power switch Mp is switched from an on-state to an off-state, there is a positive voltage spike at an internal power supply PVDD of the buck regulator 102 (due to the current continuity of parasitic inductance) and a negative voltage spike at the connection terminal between the power switches Mp and Mn (due to the discharging of parasitic capacitance). During such a transition interval, a strong voltage stress is applied to the power switch Mp. The power switch Mp may be damaged.

FIG. 1B depicts a step-up (boost) regulator 104. When the power switch Mn is switched from an on-state to an off-state, there is a negative voltage spike at an internal ground Pgnd of the buck regulator 104 (due to the current continuity of parasitic inductance) and a positive voltage spike at the connection terminal between the power switches Mp and Mn (due to the charging of parasitic capacitance). During such a transition interval, a strong voltage stress is applied to the power switch Mn. The power switch Mn may be damaged.

How to protect the power switches Mp and Mn as well as the MOSs in the power switch drivers from being damaged is an important issue in the field of switching regulators.

BRIEF SUMMARY OF THE INVENTION

A switching regulator which clamps the power or the ground of the power switch driver is introduced in the present invention.

In some exemplary embodiments, buck regulators are introduced. A buck regulator in accordance with an exemplary embodiment of the present invention comprises a first power switch, an inductor, a diode, a first driver and a driver power clamp. The first power switch is coupled between the input terminal of the buck regulator and the first terminal of the inductor. The second terminal of the inductor is coupled to the output terminal of the buck regulator. The diode is forward biased to provide a current path coupled to the first terminal of the inductor when the first power switch is turned off. The first driver is configured to drive the first power switch. The driver power clamp is configured to clamp a voltage at a ground terminal of the first driver.

In some exemplary embodiments, boost regulators are introduced. A boost regulator in accordance with an exemplary embodiment of the present invention comprises an inductor, a first power switch, a diode, a first driver, and a driver power clamp. The first terminal of the inductor is coupled to the input terminal of the boost regulator, and the first power switch is coupled between the second terminal of the inductor and the negative supply terminal of a power supply. The diode is forward biased when the first power switch is turned off to establish a current path between the second terminal of the inductor and an output terminal of the switching regulator. The first driver is configured to drive the first power switch. The driver power clamp is configured to clamp a voltage at the power terminal of the first driver.

In some exemplary embodiments, the driver power clamp is implemented by a voltage divider and activated during the transition intervals while the first driver switches the first power switch from an on-state to an off-state.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments carrying out the invention. This description is made for the purpose of illustrating the general principles of the invention and should not be taken in a limiting sense. The scope of the invention is best determined by reference to the appended claims.

A switching regulator which clamps the power or the ground of the power switch driver is introduced in the present invention.

Figure 2A:
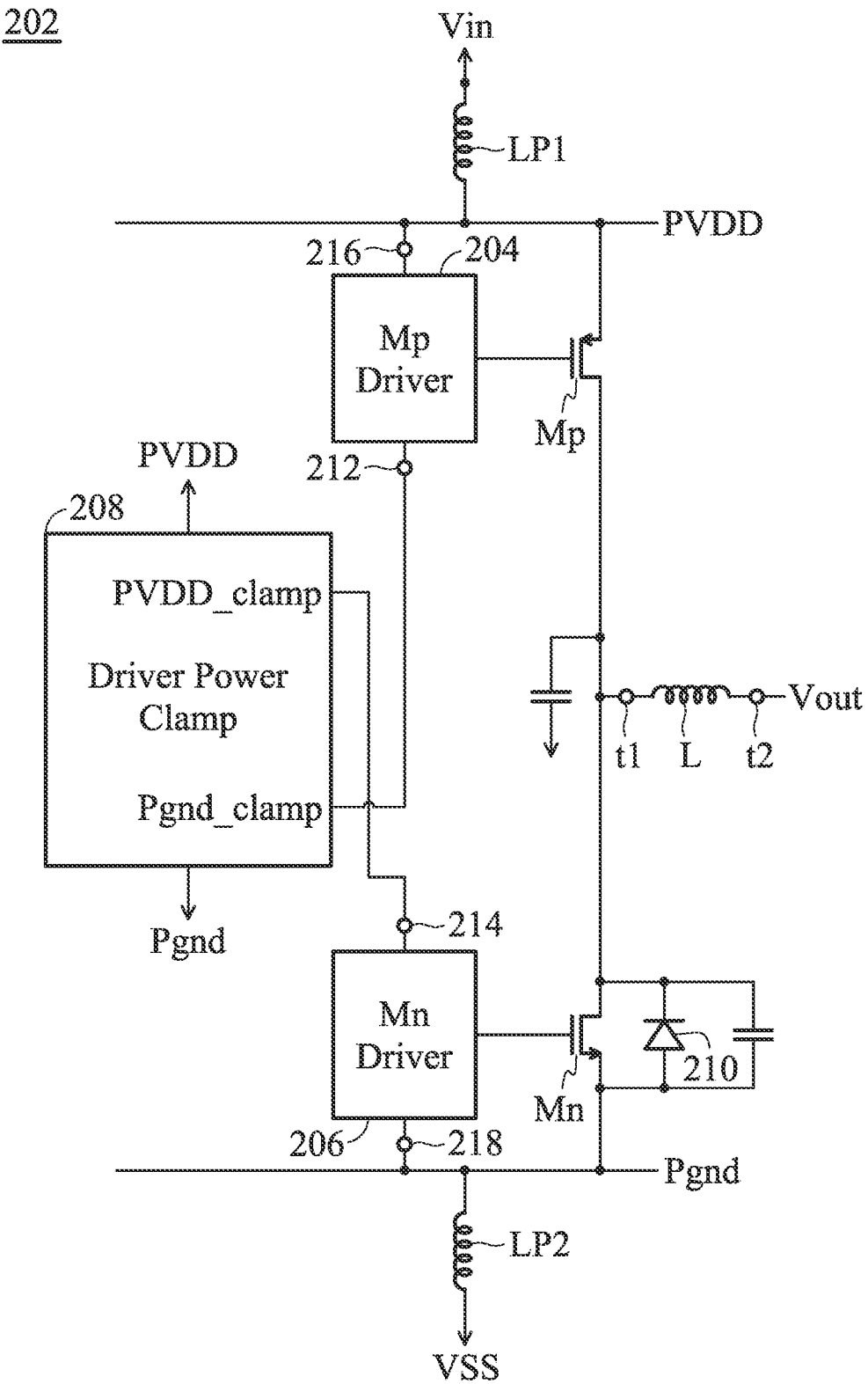
FIG. 2A depicts a step-down (buck) regulator 202 in accordance with an exemplary embodiment of the present invention.

FIG. 2A depicts a step-down (buck) regulator 202 in accordance with an exemplary embodiment of the present invention.

The buck regulator 202 has a first power switch Mp, a second power switch Mn, an inductor L, a first driver (Mp driver) 204 configured to drive the first power switch Mp, a second driver (Mn driver) 206 configured to drive the second power switch Mn, and a driver power clamp 208 clamping the power of the first driver 204 and clamping the ground of the second driver 206.

The first power switch Mp is coupled between an input terminal Vin of the buck regulator 202 and a first terminal t1 of the inductor L, and a second terminal t2 of the inductor L is coupled to an output terminal Vout of the buck regulator 202. The second power switch Mn is coupled between the first terminal t1 of the inductor L and an internal ground Pgnd of the buck regulator 202.

When the first power switch Mp is turned on, a body diode 210 of the second power switch Mn is reverse biased. A current flows from the input terminal Vin of the buck regulator 202 to the inductor L to a connected load at the output terminal Vout of the buck regulator 202. When the first power switch Mp is turned off, the body diode 210 of the second power switch Mn is forward biased to establish a current path coupled to the first terminal t1 of the inductor L. Due to the loop established by the current path, the stored energy in the inductor L forces the current to continue flowing through the load in the same direction. A step-down voltage is generated at the output terminal Vout of the buck regulator 202.

Figure 1A:
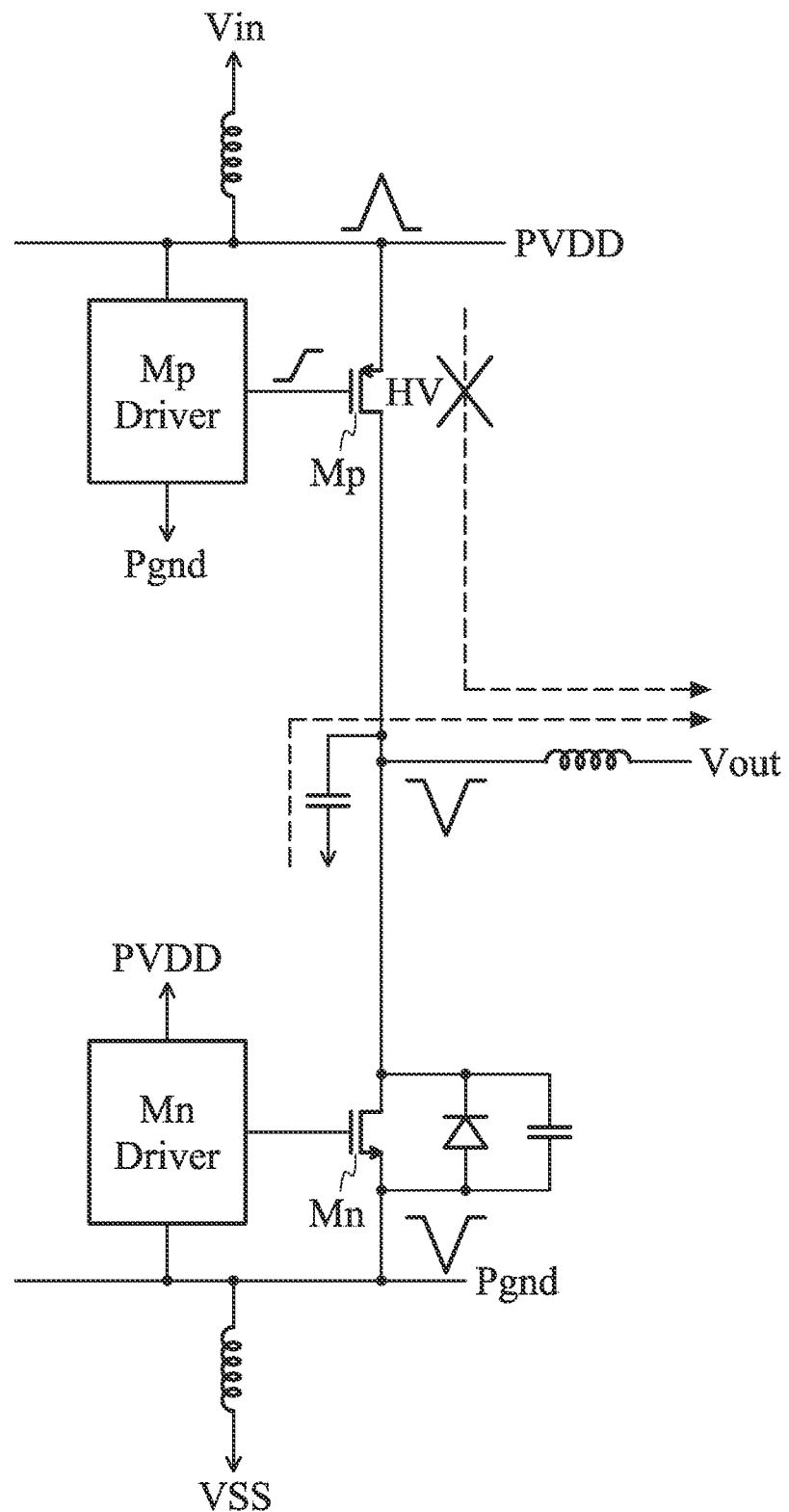
FIG. 1A depicts a step-down (buck) regulator 102.

It should be noted that the driver power clamp 208 generates a clamped internal ground Pgnd_clamp to clamp the voltage at a ground terminal 212 of the first driver 204. In this manner, the bounce at the ground terminal 212 of the first driver 204 is controlled within a limited region. The first power switch Mp is operated in a safe region and is protected from being damaged by the voltage stress depicted in FIG. 1A. Furthermore, the MOSs in the first driver 204 are protected from being damaged, too.

In this example, the driver power clamp 208 further generates a clamped internal power supply PVDD_clamp to clamp a voltage at a power terminal 214 of the second driver 206. Thus, the bounce at the power terminal 214 of the second driver 206 is controlled within a limited region. The second power switch Mn is also protected by the driver power clamp 208. Furthermore, the MOSs in the second driver 206 are protected from being damaged, too.

More details of the buck regulator 202 are described in this paragraph. The first driver 204 has a power terminal 216 coupled to an internal power supply PVDD of the buck regulator 202. The first power switch Mp is a PMOS, having a source biased by the power terminal 216 of the first driver 204, a gate controlled by the first driver 204, and a drain coupled to the first terminal t1 of the inductor L. The second driver 206 has a ground terminal 218 coupled to an internal ground Pgnd of the buck regulator 202. The second power switch Mn is an NMOS, having a source biased by the ground terminal 218 of the second driver 206, a gate controlled by the second driver 206, and a drain coupled to the first terminal t1 of the inductor L. There is a first parasitic inductor Lp1 between the input terminal Vin of the buck regulator 202 and the internal power supply PVDD, and a second parasitic inductor Lp2 between the internal ground Pgnd and a negative supply terminal VSS of a power supply. There may be other variations in the buck regulator architecture.

In some exemplary embodiments, the second power switch Mn of the buck regulator 202 is replaced by a diode. The diode is reverse biased when the first power switch Mp is turned on and is forward biased when the first power switch Mp is turned off.

Figure 2B:
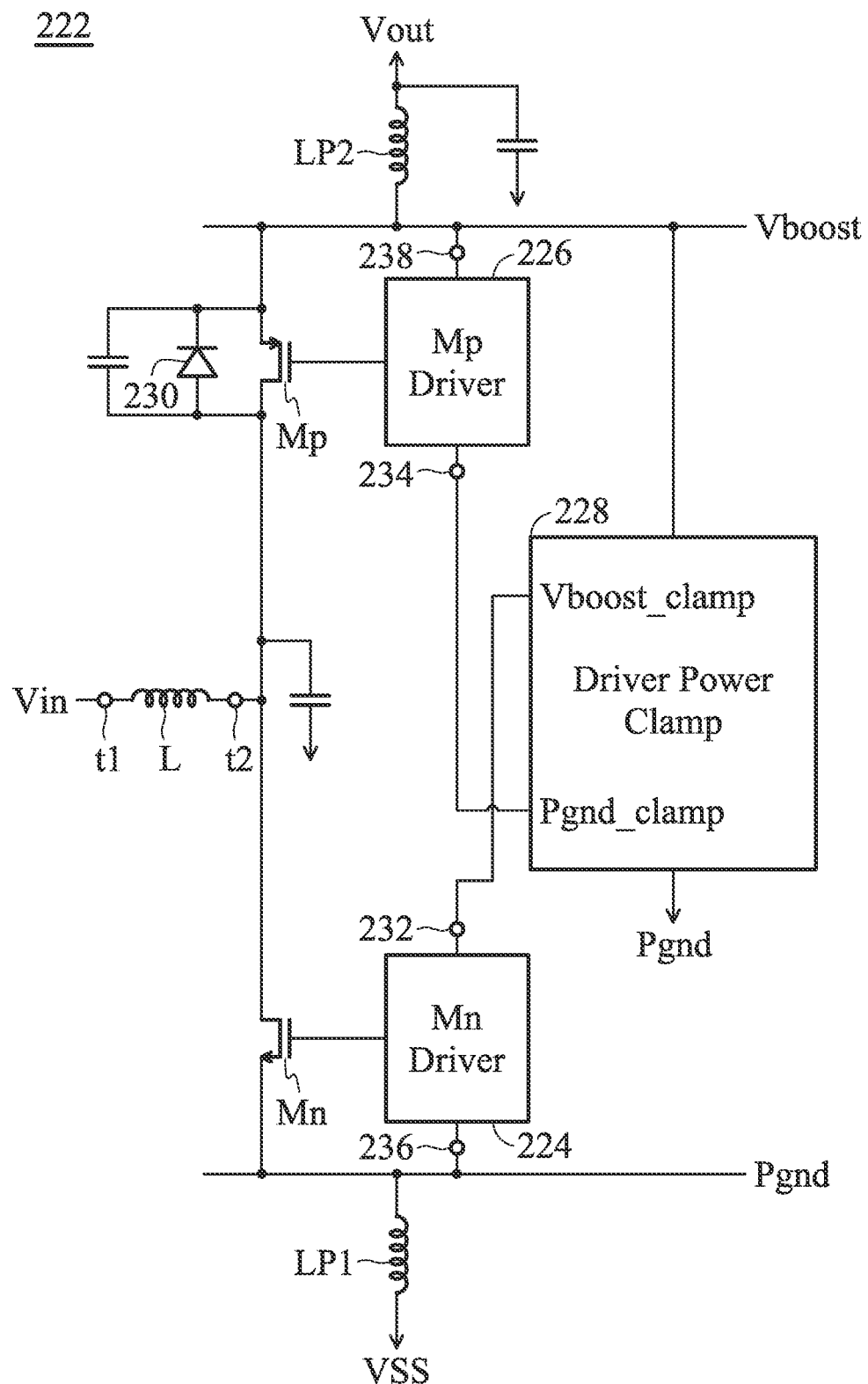
FIG. 2B depicts a step-up (boost) regulator 222 in accordance with an exemplary embodiment of the present invention.

FIG. 2B depicts a step-up (boost) regulator 222 in accordance with an exemplary embodiment of the present invention.

The boost regulator 222 has a first power switch Mn, a second power switch Mp, an inductor L, a first driver (Mn driver) 224 configured to drive the first power switch Mn, a second driver (Mp driver) 226 configured to drive the second power switch Mp, and a driver power clamp 228 clamping the power of the first driver 224 and clamping the ground of the second driver 226.

An input terminal Vin of the boost regulator 222 is coupled to a first terminal t1 of the inductor L, and the first power switch Mn is coupled between a second terminal t2 of the inductor L and a negative supply terminal VSS of a power supply.

When the first power switch Mn is turned on, a body diode 230 of the second power switch Mp is reverse biased. The current flowing through the inductor L increases due to the shorter inner path provided by the turned-on first power switch Mn. When the first power switch Mn is turned off, the body diode 230 of the second power switch Mp is forward biased to establish a current path between the second terminal t2 of the inductor L and an output terminal Vout of the boost regulator 222, and the energy stored in the inductor L is pushed to a connected load at the output terminal Vout of the boost regulator 222. A step-up voltage is generated at the output terminal Vout of the boost regulator 202. The boost regulator 202 further has an internal boost terminal Vboost (at a boost voltage also labeled Vboost).

Figure 1B:
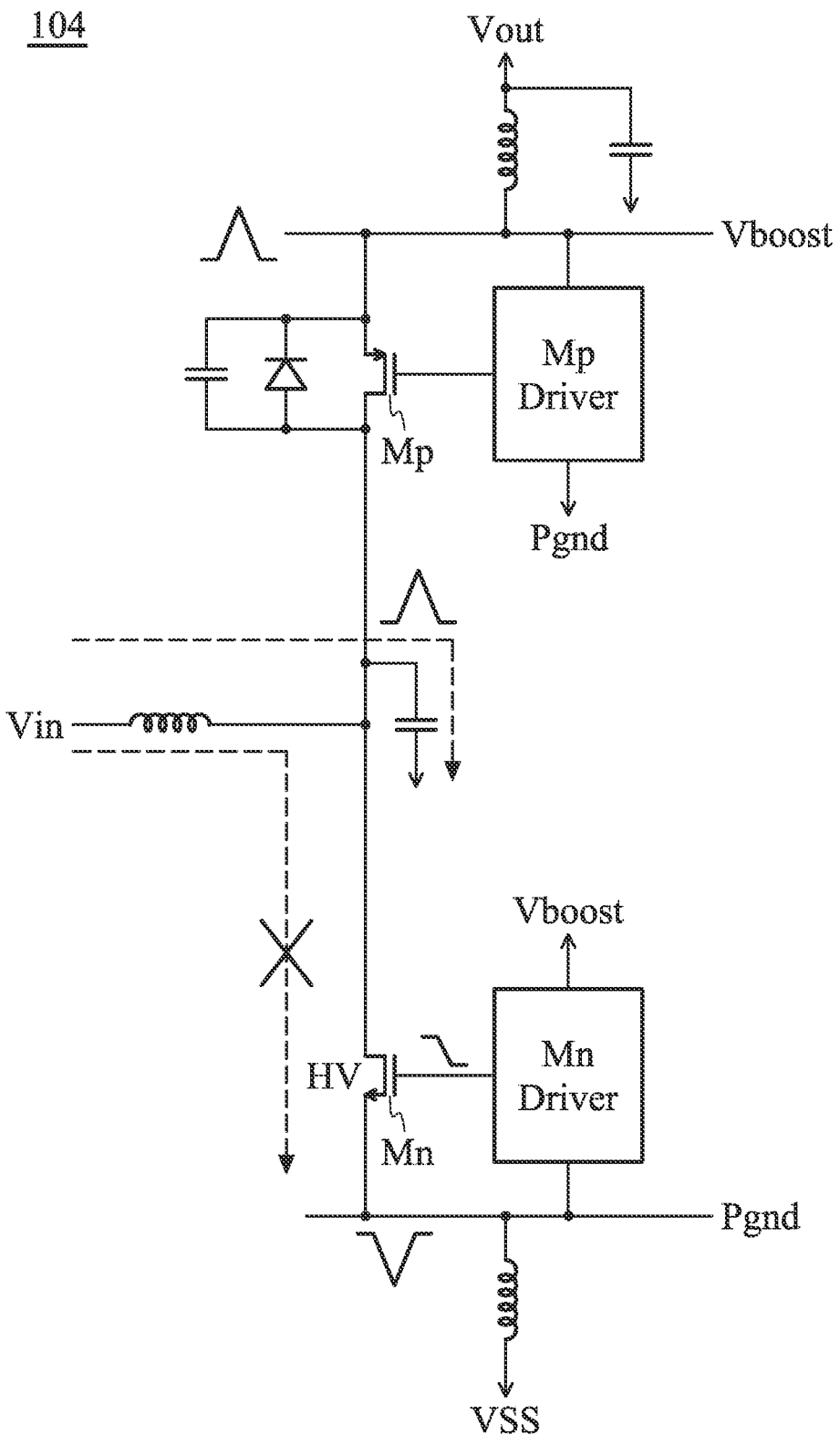
FIG. 1B depicts a step-up (boost) regulator 104.

It should be noted that the driver power clamp 228 generates a clamped boost voltage Vboost_clamp to clamp a voltage at a power terminal 232 of the first driver 224. In this manner, the bounce at the power terminal 232 of the first driver 224 is controlled within a limited region. The first power switch Mn is operated in a safe region and is protected from being damaged by the voltage stress depicted in FIG. 1B. Furthermore, the MOSs in the first driver 224 are protected from being damaged, too.

In this example, the driver power clamp 228 further generates a clamped internal ground Pgnd_clamp to clamp a voltage at a ground terminal 234 of the second driver 226. Thus, the bounce at the ground terminal 234 of the second driver 226 is controlled within a limited region. The second power switch Mp is also protected by the driver power clamp 228. Furthermore, the MOSs in the second driver 226 are protected from being damaged, too.

More details of the boost regulator 222 are described in this paragraph. The first driver 224 has a ground terminal 236 coupled to an internal ground Pgnd of the boost regulator 222. The first power switch Mn is an NMOS, having a source biased by the ground terminal 236 of the first driver 224, a gate controlled by the first driver 224, and a drain coupled to the second terminal t2 of the inductor L. The second driver 226 has a power terminal 238 that is the internal boost terminal Vboost coupled to the output terminal Vout of the boost regulator 222. The second power switch Mp is a PMOS, having a source biased by the power terminal 238 of the second driver 226, a gate controlled by the second driver 226, and a drain coupled to the second terminal t2 of the inductor L. There is a first parasitic inductor Lp1 between the internal ground Pgnd and the negative supply terminal VSS of the power supply and a second parasitic inductor Lp2 between the output terminal Vout of the boost regulator 222 and the internal boost terminal Vboost.

In some exemplary embodiments, the second power switch Mp of the boost regulator 222 is replaced by a diode. The diode is reverse biased when the first power switch Mn is turned on and is forward biased when the first power switch Mn is turned off.

Figure 3:
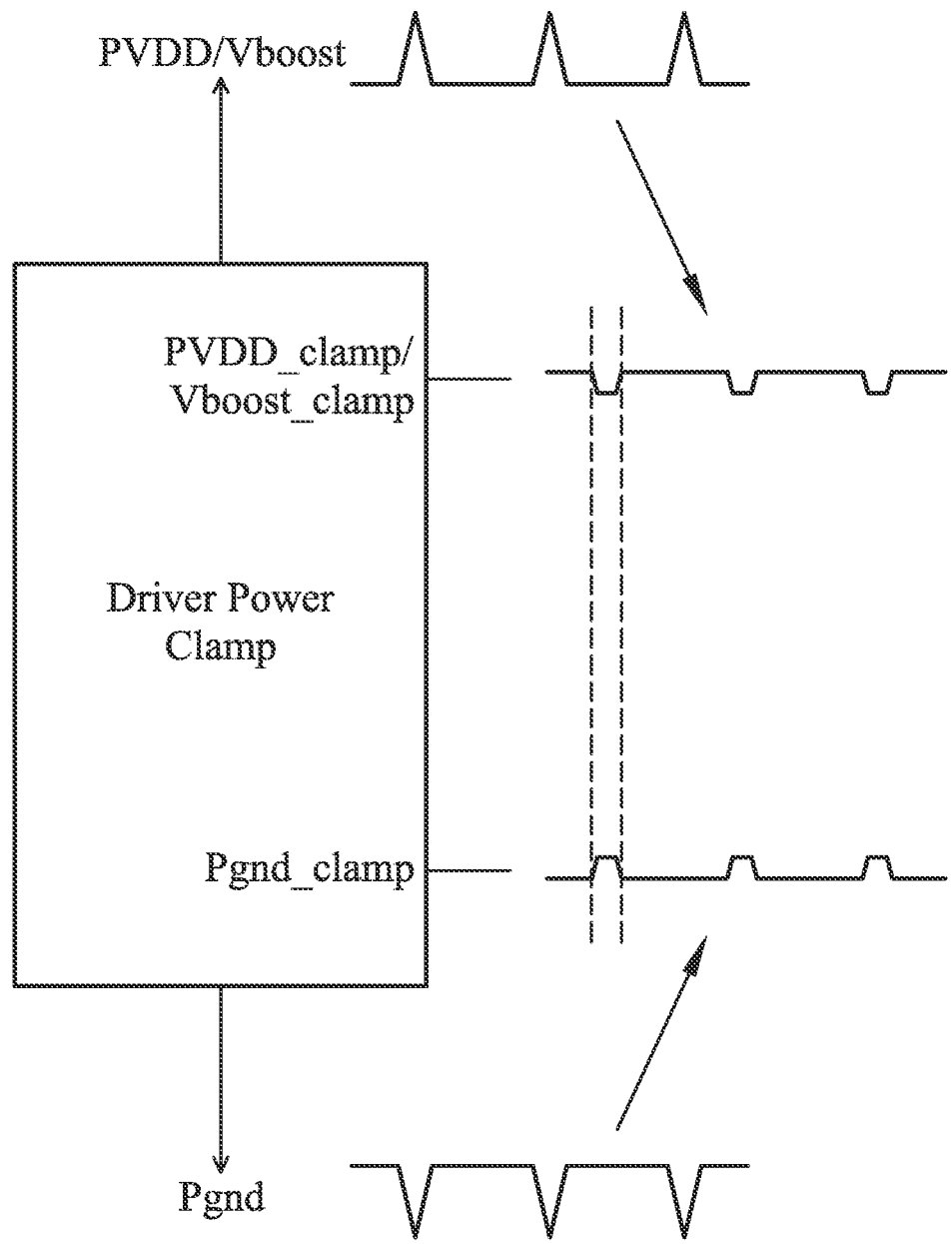
FIG. 3 depicts the clamped internal power supply PVDD_clamp (or the clamped boost voltage Vboost_clamp) and the clamped internal ground Pgnd_clamp generated by the driver power clamp 208/228.

FIG. 3 depicts the clamped internal power supply PVDD_clamp (or the clamped boost voltage Vboost_clamp) and the clamped internal ground Pgnd_clamp generated by the driver power clamp 208/228. The driver power clamp 208/228 is powered by the internal power supply PVDD (or the boost voltage Vboost) and is grounded to the internal ground Pgnd. As shown, the bounces at the internal power supply PVDD (or the bounces at the boost voltage Vboost) and the bounces at the internal ground Pgnd are effectively clamped. The clamped internal power supply PVDD_clamp (or the clamped boost voltage Vboost_clamp) and the clamped internal ground Pgnd_clamp are applied to the power switch drivers to protect the power switches Mp and Mn and the MOSs of the power switch driver from being damaged.

Figure 4A:
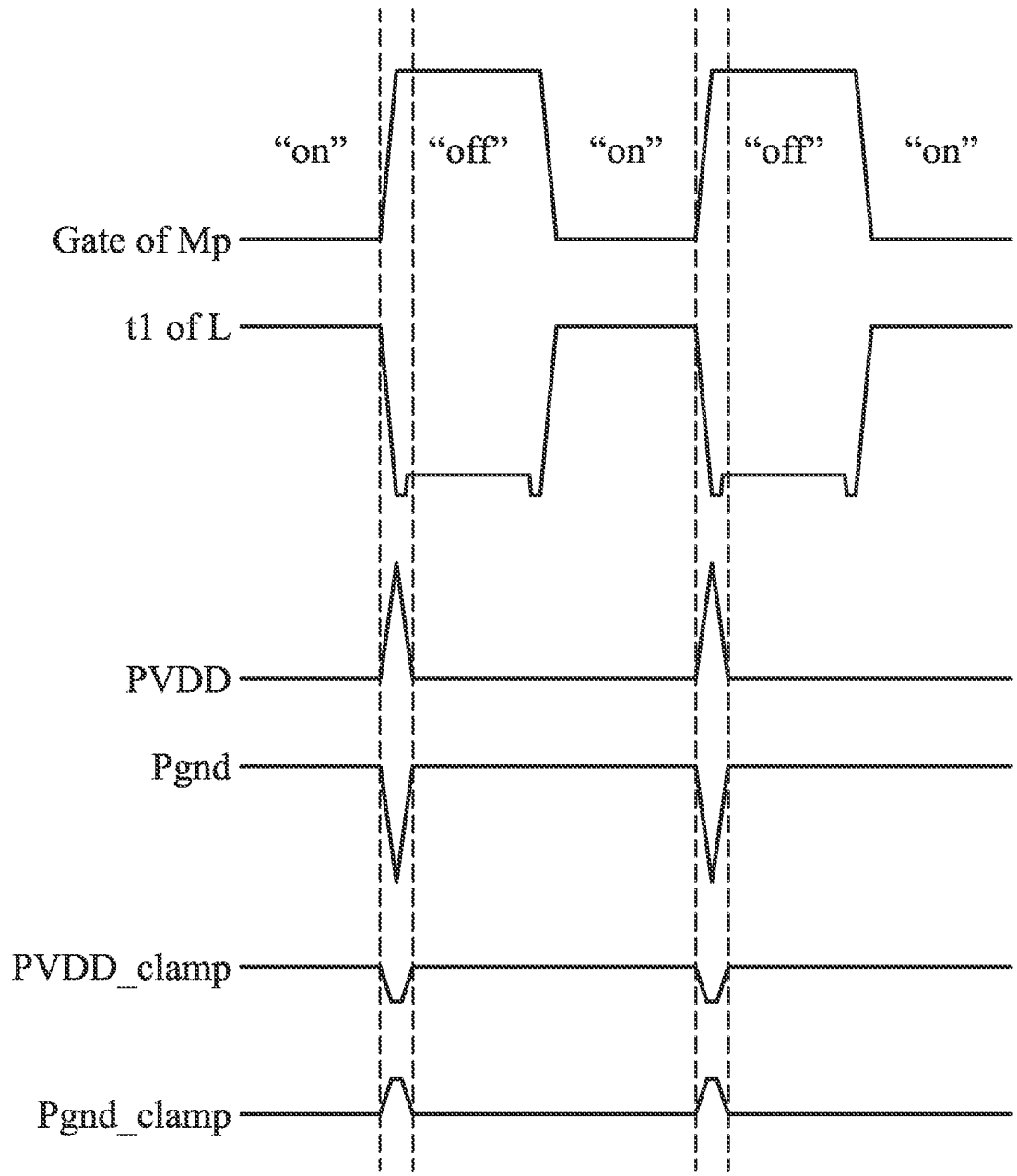
FIG. 4A depicts the timing of driver power clamping of the buck regulator 202 in accordance with an exemplary embodiment of the present invention.

FIG. 4A depicts the timing of driver power clamping of the buck regulator 202 in accordance with an exemplary embodiment of the present invention. The driver power clamp 208 is activated during transition intervals while the first driver 204 switches the first power switch Mp from an on-state to an off-state.

Figure 4B:
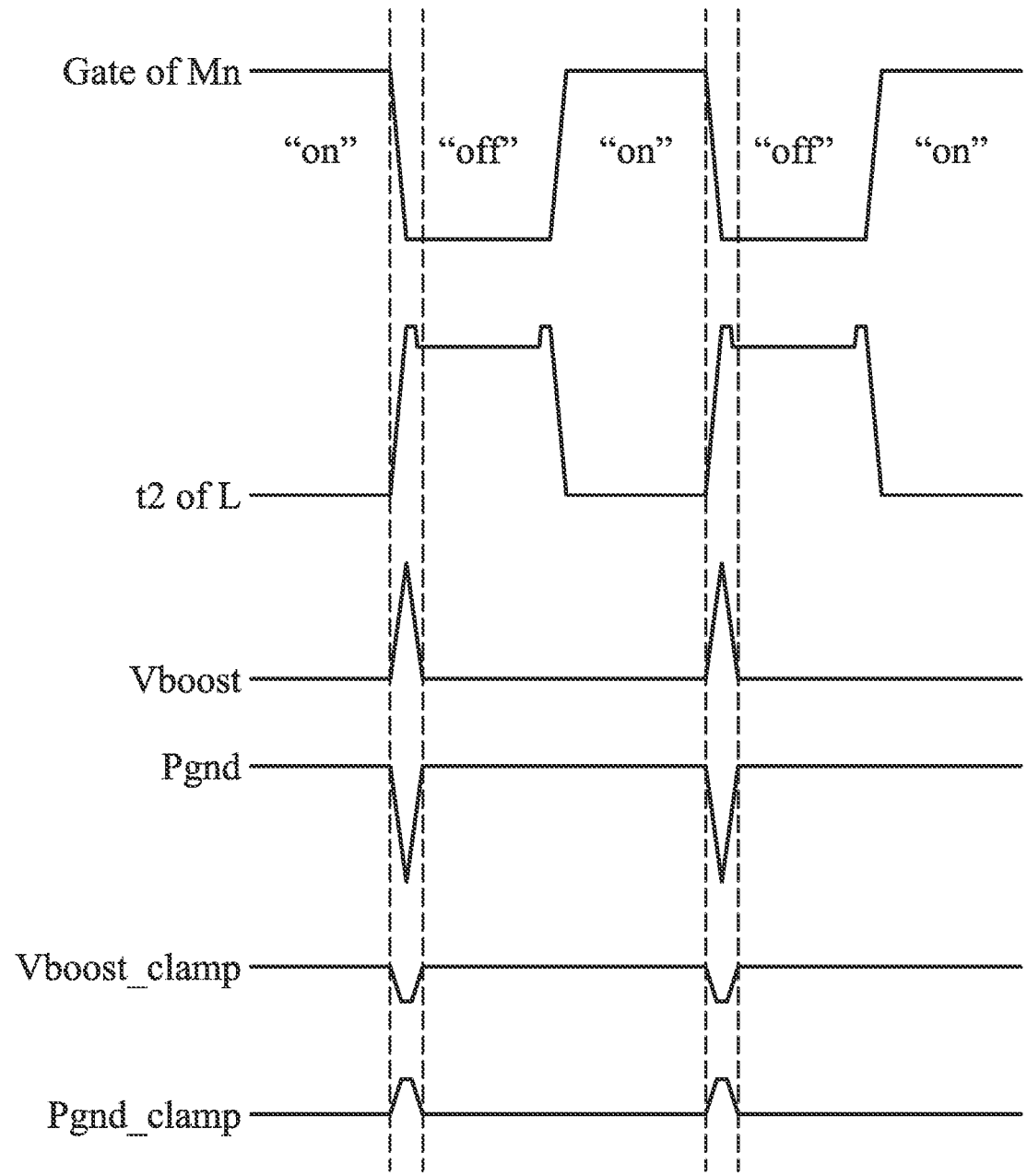
FIG. 4B depicts the timing of driver power clamping of the boost regulator 222 in accordance with an exemplary embodiment of the present invention.

FIG. 4B depicts the timing of driver power clamping of the boost regulator 222 in accordance with an exemplary embodiment of the present invention. The driver power clamp 228 is activated during transition intervals while the first driver 224 switches the first power switch Mn from an on-state to an off-state.

In some exemplary embodiments, the driver power clamp 208/228 is implemented by voltage dividers.

Figure 5A:
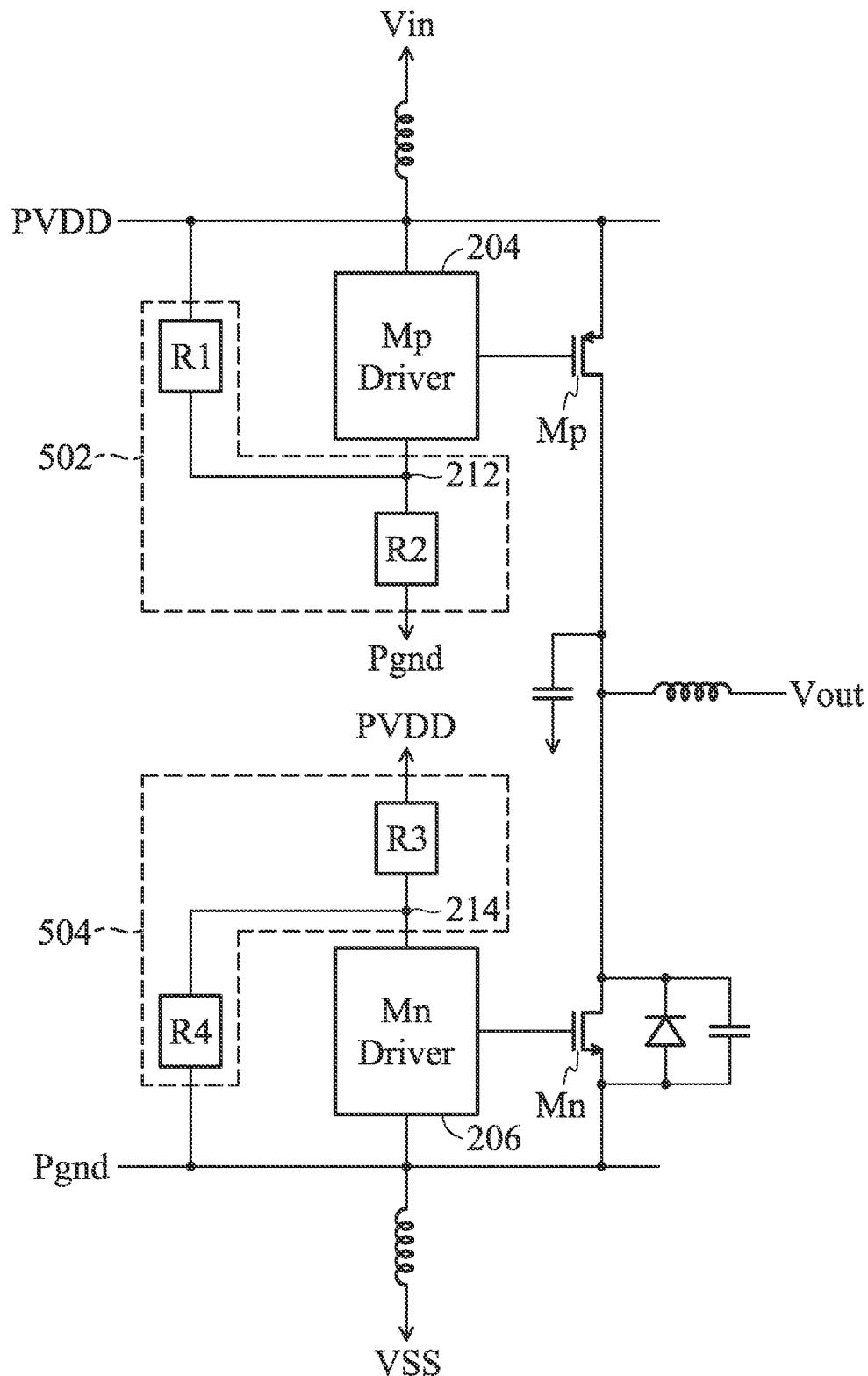
FIG. 5A depicts a first voltage divider 502 and a second voltage 504 for driver power clamping of the buck regulator 202.

FIG. 5A depicts a first voltage divider 502 and a second voltage 504 for driver power clamping of the buck regulator 202. The first voltage divider 502 has a first resistive element R1 and a second resistive element R2 coupled in series between the internal power supply PVDD of the buck regulator 202 and the internal ground Pgnd of the buck regulator 202. The voltage at the ground terminal 212 of the first driver 204 is clamped by a divided voltage at a connection terminal between the first resistive element R1 and the second resistive element R2. The second voltage divider 504 has a third resistive element R3 and a fourth resistive element R4 coupled in series between the internal power supply PVDD of the buck regulator 202 and the internal ground Pgnd of the buck regulator 202. The voltage at the power terminal 214 of the second driver 206 is clamped by a divided voltage at a connection terminal between the third resistive element R3 and the fourth resistive element R4. It should be noted that the driver power clamping shown in FIG. 5A is performed during transition intervals while the first driver 204 switches the first power switch Mp from an on-state to an off-state.

Figure 5B:
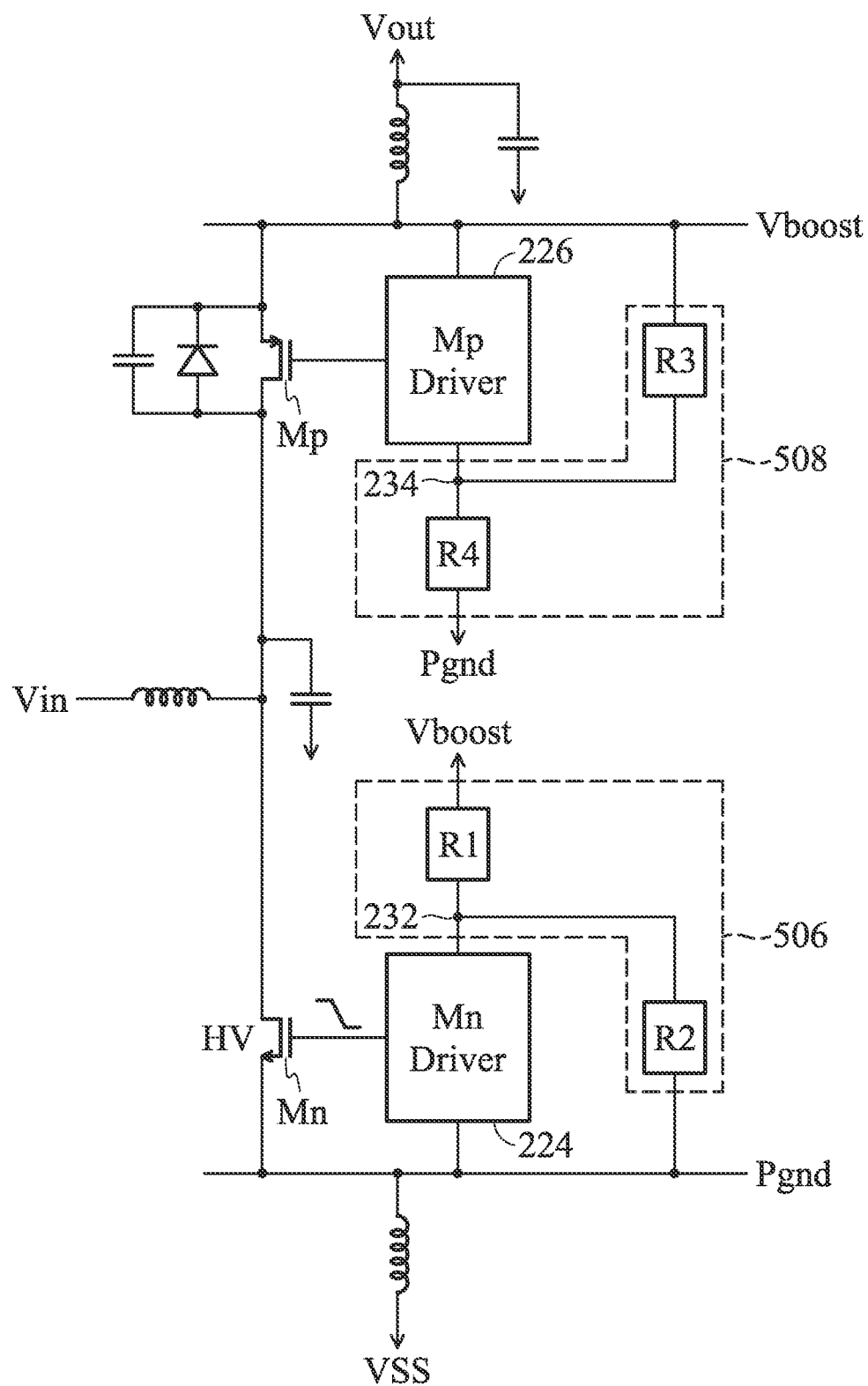
FIG. 5B depicts a first voltage divider 506 and a second voltage 508 for driver power clamping of the boost regulator 222.

FIG. 5B depicts a first voltage divider 506 and a second voltage 508 for driver power clamping of the boost regulator 222. The first voltage divider 506 has a first resistive element R1 and a second resistive element R2 coupled in series between the boost voltage Vboost and the internal ground Pgnd of the boost regulator 222. The voltage at the power terminal 232 of the first driver 224 is clamped by a divided voltage at a connection terminal between the first resistive element R1 and the second resistive element R2. The second voltage divider 508 has a third resistive element R3 and a fourth resistive element R4 coupled in series between the boost voltage Vboost and the internal ground Pgnd of the boost regulator 222. The voltage at the ground terminal 234 of the second driver 226 is clamped by a divided voltage at a connection terminal between the third resistive element R3 and the fourth resistive element R4. It should be noted that the driver power clamping shown in FIG. 5B is performed during transition intervals while the first driver 224 switches the first power switch Mn from an on-state to an off-state.

There may be various modifications of the switching regulator architecture. Any switching regulator with a driver power clamp should be considered within the scope with the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching regulator with a driver power clamp, comprising:

a first power switch and an inductor, wherein the first power switch is coupled between an input terminal of the switching regulator and a first terminal of the inductor, and a second terminal of the inductor is coupled to an output terminal of the switching regulator;

a diode, forward biased to provide a current path coupled to the first terminal of the inductor when the first power switch is turned off;

a first driver, configured to drive the first power switch; and the driver power clamp, configured to clamp a voltage at a ground terminal of the first driver;

wherein:

during transition intervals while the first driver switches the first power switch from an on-state to an off-state, the driver power clamp shifts the voltage of the ground terminal of the first driver to a higher level in comparison with a normal internal ground level; and prior to switching the first power switch from the on-state to the off-state, the voltage of the ground terminal of the first driver is at the normal internal ground level.

2. The switching regulator as claimed in claim 1, wherein:

the driver power clamp comprises a first voltage divider;

the first voltage divider has a first resistive element and a second resistive element coupled in series between an internal power supply of the switching regulator and the internal ground of the switching regulator; and during the transition intervals, the voltage at the ground terminal of the first driver is clamped by a divided voltage at a connection terminal between the first resistive element and the second resistive element.

3. The switching regulator as claimed in claim 2, wherein:
the connection terminal between the first resistive element and the second resistive element is connected to the ground terminal of the first driver during the transition intervals.

4. The switching regulator as claimed in claim 1, further comprising:
a second power switch, coupled between the first terminal of the inductor and the internal ground of the switching regulator,
wherein:
when the first power switch is turned off, the diode forward biased is a body diode of the second power switch.

5. The switching regulator as claimed in claim 4, further comprising:
a second driver, configured to drive the second power switch,
wherein the driver power clamp is further configured to clamp a voltage at a power terminal of the second driver.

6. The switching regulator as claimed in claim 5, wherein:
the driver power clamp comprises a first voltage divider;
the first voltage divider has a first resistive element and a second resistive element coupled in series between an internal power supply of the switching regulator and the internal ground of the switching regulator; and
during the transition intervals, the voltage at the ground terminal of the first driver is clamped by a divided voltage at a connection terminal between the first resistive element and the second resistive element.

7. The switching regulator as claimed in claim 6, wherein:
the driver power clamp further comprises a second voltage divider;
the second voltage divider has a third resistive element and a fourth resistive element coupled in series between the internal power supply of the switching regulator and the internal ground of the switching regulator; and
during the transition intervals, the voltage at the power terminal of the second driver is clamped by a divided voltage at a connection terminal between the third resistive element and the fourth resistive element.

8. The switching regulator as claimed in claim 7, wherein:
during the transition intervals, the connection terminal between the first resistive element and the second resistive element is connected to the ground terminal of the first driver and the connection terminal between the third resistive element and the fourth resistive element is connected to the power terminal of the second driver.

9. The switching regulator as claimed in claim 8, wherein:
the first driver has a power terminal coupled to the internal power supply of the switching regulator;
the first power switch is a PMOS, having a source biased by the power terminal of the first driver, a gate controlled by the first driver, and a drain coupled to the first terminal of the inductor;
the second driver has a ground terminal coupled to the internal ground of the switching regulator; and
the second power switch is an NMOS, having a source biased by the ground terminal of the second driver, a gate controlled by the second driver, and a drain coupled to the first terminal of the inductor.

10. The switching regulator as claimed in claim 9, further comprising:
a first parasitic inductor between the input terminal of the switching regulator and the internal power supply of the switching regulator; and
a second parasitic inductor between the internal ground of the switching regulator and a negative supply terminal of a power supply.

11. A switching regulator with driver power clamp, comprising:
an inductor and a first power switch, wherein a first terminal of the inductor is coupled to an input terminal of the switching regulator, and the first power switch is coupled between a second terminal of the inductor and a negative supply terminal of a power supply;
a diode, forward biased when the first power switch is turned off to establish a current path from the second terminal of the inductor to a boost terminal of the switching regulator and then to an output terminal of the switching regulator;
a first driver, configured to drive the first power switch; and
a driver power clamp, configured to clamp a voltage at a power terminal of the first driver;
wherein:
during transition intervals while the first driver switches the first power switch from an on-state to an off-state, the driver power clamp shifts the voltage of the power terminal of the first driver to a lower level in comparison with a normal boost level; and
prior to switching the first power switch from the on-state to the off-state, the power terminal of the first driver is at the normal boost level.

12. The switching regulator as claimed in claim 11, wherein:
the driver power clamp comprises a first voltage divider; and
the first voltage divider has a first resistive element and a second resistive element coupled in series between the boost terminal of the switching regulator and an internal ground of the switching regulator; and
during the transition intervals, the voltage at the power terminal of the first driver is clamped by a divided voltage at a connection terminal between the first resistive element and the second resistive element.

13. The switching regulator as claimed in claim 12, wherein:
the connection terminal between the first resistive element and the second resistive element is connected to the power terminal of the first driver during the transition intervals.

14. The switching regulator as claimed in claim 11, further comprising:
a second power switch, coupled between the second terminal of the inductor and the output terminal of the switching regulator,
wherein:
when the first power switch is turned off, the diode forward biased is a body diode of the second power switch.

15. The switching regulator as claimed in claim 14, further comprising:
a second driver, configured to drive the second power switch,
wherein the driver power clamp is further configured to clamp a voltage at a ground terminal of the second driver.

16. The switching regulator as claimed in claim 15, wherein:
the driver power clamp comprises a first voltage divider; and the first voltage divider has a first resistive element and a second resistive element coupled in series between the boost terminal of the switching regulator and an internal ground of the switching regulator; and during the transition intervals, the voltage at the power terminal of the first driver is clamped by a divided voltage at a connection terminal between the first resistive element and the second resistive element.

17. The switching regulator as claimed in claim 16, wherein:
the driver power clamp further comprises a second voltage divider; and
the second voltage divider has a third resistive element and a fourth resistive element coupled in series between the boost terminal of the switching regulator and the internal ground of the switching regulator; and
during the transition intervals, the voltage at the ground terminal of the second driver is clamped by a divided voltage at a connection terminal between the third resistive element and the fourth resistive element.

18. The switching regulator as claimed in claim 17, wherein:
during the transition intervals, the connection terminal between the first resistive element and the second resistive element is connected to the power terminal of the first driver and the connection terminal between the third resistive element and the fourth resistive element is connected to the ground terminal of the second driver.

19. The switching regulator as claimed in claim 18, wherein:
the first driver has a ground terminal coupled to the internal ground of the switching regulator;
the first power switch is an NMOS, having a source biased by the ground terminal of the first driver, a gate controlled by the first driver, and a drain coupled to the second terminal of the inductor;
the second driver has a power terminal coupled to the boost terminal of the switching regulator; and
the second power switch is a PMOS, having a source biased by the power terminal of the second driver, a gate controlled by the second driver, and a drain coupled to the second terminal of the inductor.

20. The switching regulator as claimed in claim 19, further comprising:
a first parasitic inductor between the internal ground of the switching regulator and the negative supply terminal of the power supply; and
a second parasitic inductor between a the boost terminal of the switching regulator and the output terminal of the switching regulator.

* * * * *